June 28, 1927.

D. ROBERTSON 1,634,158

ATTACHMENT OF MOTOR VEHICLE ROAD SPRINGS

Filed Jan. 6, 1926

INVENTOR
DOUGLAS ROBERTSON
BY
ATTORNEYS

Patented June 28, 1927.

1,634,158

UNITED STATES PATENT OFFICE.

DOUGLAS ROBERTSON, OF NURIOOTPA, AUSTRALIA.

ATTACHMENT OF MOTOR-VEHICLE ROAD SPRINGS.

Application filed January 6, 1926. Serial No. 79,621.

This invention comprises certain improvements in the attachment of motor vehicle road springs. It is applicable to those springs which are hingedly attached either direct to the vehicle frame member or to the axle, or to a bracket secured to the frame member or to the axle, as well as to springs which are attached by means of a shackle.

According to this invention the bearing of the hinge bolt within the eye is formed by a series of circular threads or opposed inclined bearing surfaces formed upon the opposed faces of two concentric bushes, the one bush encircling and being fitted securely to the bolt and the other bush fitting within and being held by the eye, the said circular threads forming a plurality of annular grooves and ridges of somewhat flattened V shape in cross section, whereby sidewise movement of the spring leaf relatively to the frame member, shackle plates or other part is prevented and rattle is eliminated.

In order that my invention may be more clearly understood I will describe the same with reference to the accompanying drawings which are given by way of illustration or example, and in which—

Figure 1:
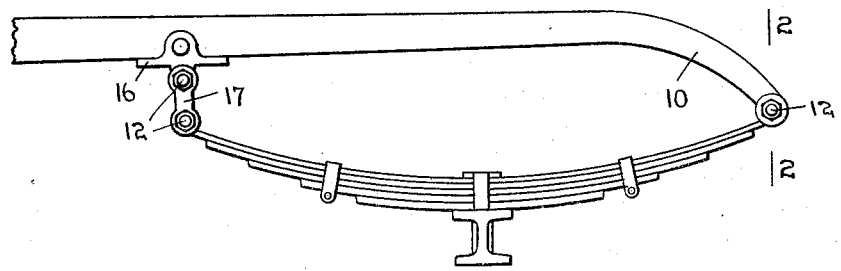
Fig. 1 is a side view showing the usual arrangement of a semi-elliptic spring relatively to a vehicle frame, the one end of the spring being hingedly attached direct to the frame member and the other end being attached thereto by means of a shackle and a bracket.
Figure 2:
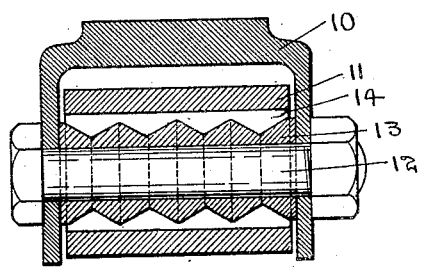
Fig. 2 is a central section as upon line 2, 2 of Fig. 1 showing my invention applied to the attachment of the one end of a spring to the end of a vehicle frame member or to a bracket upon same.

In the drawings 10 represents the frame member or bracket to which the spring is hingedly attached. 11 represents the eye of the spring, and 12 represents the hinge bolt which passes through and is held immovably in the cheeks of the frame member or bracket 10. Fitting tightly upon the bolt 12 is a bush 13 the external surface of which is made in the form of a series of circular threads or inclined bearing surfaces which form a plurality of grooves and ridges of somewhat flattened V-shape in cross section. The bush 13 fits tightly upon the bolt 12 and does not move thereon.

Encircling the bush 13 and fitting tightly within the eye 11 is a bush 14 having internal circular threads or inclined bearing surfaces forming a plurality of annular ridges and grooves of somewhat flattened V shape complementary to and fitting neatly to the grooves and ridges of the bush 13, the contacting faces of the grooves and ridges forming the working surfaces of the bearing. The encircling bush 14 must be split longitudinally and assembled over the bush 13 before it is inserted into the eye 11. After being assembled the bush 14 does not move with the eye 11.

A small clearance is left between the ends of the bush 14 and cheeks of the frame member 10 which may be fitted with a felt washer or some soft substance which will retain lubricant.

As shown in Fig. 1 the one end of the spring is attached to the frame member 10 by means of a bracket 16 and shackle 17 in which case the eye of the bracket 16 is bushed similarly to the eye of the spring.

The weight of the vehicle holds the encircling bush 14 central upon the encircled bush 13 and prevents sidewise movement, and consequently prevents rattle of the spring against the frame member or bracket.

What I claim is—

In an attachment for the road spring of a motor vehicle, the combination with a hinged bolt, of a bush encircling the bolt and fitted to said bolt, a second bush cylindrical in shape and split longitudinally and adapted to receive the first-mentioned bush, said bushes having circular threads located in spaced relation, the threads of the first-mentioned bush being complementary to those of the second-mentioned bush and an eye receiving the second-mentioned bush for holding the split sections of said bush in position on the first-mentioned bush.

In testimony that I claim the foregoing as my invention I have signed my name this 6th day of November, 1925.

DOUGLAS ROBERTSON.